United States Patent
Geli Pons et al.

(10) Patent No.: US 12,208,355 B2
(45) Date of Patent: Jan. 28, 2025

(54) ETHYLENE-ABSORBING SACHET AND METHOD FOR PRODUCING THE GRANULATE CONTAINED INSIDE SAME

(71) Applicant: GREENKEEPER IBERIA, S.L., Madrid (ES)

(72) Inventors: Ramon Geli Pons, Madrid (ES); Monica Sabater Vilar, Madrid (ES); Carmen Moreno Guerrero, Madrid (ES)

(73) Assignee: GREENKEEPER IBERIA, S.L., Madrid (ES)

( * ) Notice: Subject to any disclaimer, the term of this patent is extended or adjusted under 35 U.S.C. 154(b) by 840 days.

(21) Appl. No.: 17/264,474

(22) PCT Filed: Jun. 20, 2019

(86) PCT No.: PCT/ES2019/070430
§ 371 (c)(1),
(2) Date: Jan. 29, 2021

(87) PCT Pub. No.: WO2020/025841
PCT Pub. Date: Feb. 6, 2020

(65) Prior Publication Data
US 2021/0316245 A1 Oct. 14, 2021

(30) Foreign Application Priority Data
Aug. 1, 2018 (ES) .................. P201830799

(51) Int. Cl.
*B01D 53/04* (2006.01)
*B01J 20/04* (2006.01)
(Continued)

(52) U.S. Cl.
CPC ........ *B01D 53/0407* (2013.01); *B01J 20/041* (2013.01); *B01J 20/20* (2013.01);
(Continued)

(58) Field of Classification Search
CPC ............... B01D 53/04; B01D 53/0407; B01D 2253/102; B01D 2253/112;
(Continued)

(56) References Cited

U.S. PATENT DOCUMENTS 3,058,863 A 10/1962 Abit et al.
4,332,845 A 6/1982 Nawata et al.
(Continued)

FOREIGN PATENT DOCUMENTS

WO WO-2015110682 A1 * 7/2015 ........... B65D 81/268
WO 2016016503 A1 2/2016

OTHER PUBLICATIONS

Machine-generated English translation of WO 2015-110682 A1, published Jul. 2015.*
(Continued)

*Primary Examiner* — Frank M Lawrence, Jr.
(74) *Attorney, Agent, or Firm* — Patenting Consulting Group; Roberto J. Rios

(57) ABSTRACT

Ethylene-absorbing sachet and method for producing the granulate contained inside same, comprising a packaging formed by two sheets, one anterior (2) and one posterior (3), which are mutually joined along their edges (4) by means of welding, at least one of which, for example, the anterior sheet (2), is manufactured from porous, water-repellent, and breathable material, combined or not with another sheet (3) of impermeable material and with a granulate (5) of ethylene-absorbing material contained inside said packaging, whereby said granulate (5) has a small particle size and lacks fine powder floating in the air and has a high filling density inside the sachet (1); specifically, with a particle size of between approximately 2 and 0.125 mm and a density of between approximately 0.8 and 1.1 g/ml. Said granulate may (Continued)

comprise a substrate impregnated with potassium permanganate or a mixture with activated carbon.

8 Claims, 2 Drawing Sheets

(51) Int. Cl.
  *B01J 20/20*    (2006.01)
  *B01J 20/28*    (2006.01)
(52) U.S. Cl.
  CPC ... *B01J 20/28004* (2013.01); *B01J 20/28011* (2013.01); *B01J 20/28016* (2013.01); *B01J 20/2805* (2013.01); *B01D 2253/102* (2013.01); *B01D 2253/112* (2013.01); *B01D 2253/25* (2013.01); *B01D 2253/304* (2013.01); *B01D 2257/7022* (2013.01)
(58) Field of Classification Search
  CPC .......... B01D 2253/25; B01D 2253/304; B01D 2257/7022; B01J 20/041; B01J 20/20; B01J 20/28004; B01J 20/28011; B01J 20/28016; B01J 20/2805; B32B 7/02
  USPC .............................. 96/154; 95/144
  See application file for complete search history.

(56) References Cited

U.S. PATENT DOCUMENTS

| | | | |
|---|---|---|---|
| 4,487,791 A | 12/1984 | Komatsu et al. | |
| 5,820,955 A * | 10/1998 | Brander | B65D 81/264 |
| | | | 428/36.1 |
| 7,387,205 B1 * | 6/2008 | Wilson | B65D 81/268 |
| | | | 206/524.4 |
| 2014/0272039 A1 * | 9/2014 | McKedy | A23B 7/157 |
| | | | 252/400.1 |

OTHER PUBLICATIONS

Internet Document "Solutions for Ethylene Removal" published 2011; https://www.purafil.com/wp-content/uploads/2014/12/Ethylene-Solutions.pdf.*

* cited by examiner

ETHYLENE-ABSORBING SACHET AND METHOD FOR PRODUCING THE GRANULATE CONTAINED INSIDE SAME

OBJECT OF THE INVENTION

As expressed in the title of the present specification, the invention relates to an ethylene-absorbing sachet and to the method for producing the granulate contained inside said sachet, providing the intended function thereof with advantages and novelty features that are described in detail below and constitute an improvement in the current state of the art.

More specifically, the object of the invention focuses on an absorbent sachet of the types which are configured as a packaging in the form of a sachet, manufactured from porous, water-repellent, and breathable technical materials combined or not with impermeable materials, and incorporate therein granulated ethylene-absorbing materials, being applicable for absorbing gases of said type or other volatiles produced by fresh products such as fruits, vegetables, flowers, or ornamental plants, and preventing them from spoiling too soon, the invention being characterized in that the mentioned absorbent material content in the form of granulate, which preferably consists of a substrate impregnated with potassium permanganate, which has gone through an extrusion process or not, or a mixture of said substrate impregnated with activated carbon, has a particle size specifically obtained by means of a specific method which allows rendering the granulate with a specific smaller dimension and greater filling density in comparison with the granulate used today in sachets of said type currently existing on the market, which advantageously allows the inclusion of a higher amount of granulate in a specific sachet format and the manufacture of sachets having a smaller size, which in turn translates into sachet material savings that allows making this technology more economical, and accordingly expanding the application thereof in the sector.

FIELD OF APPLICATION OF THE INVENTION

The field of application of the present invention is comprised within the sector of the industry dedicated to gas filtration, specifically in the manufacture of breathable packaging and sachets for absorbing ethylene and/or other volatiles produced by fruits, vegetables, flowers and ornamental plants, and other fresh products.

BACKGROUND OF THE INVENTION

As a reference to the state of the art, it is necessary to mention patent number ES2547033A2 which belongs to the current applicant, Greenkeeper Iberia SL, relating to an anti-damp porous sachet, formed by two sheets, joined along their edges by means of welding and made of different materials, one of them being porous, water-repellent, breathable, and a barrier to bacteria, and the other one being impermeable and made of a laminated plastic material formed by two layers of any plastic material, the outer layer being made of a resistant plastic material, and the inner layer being made of plastic material suitable for welding to the porous sheet without using wax. The outer layer is made of polyester and the inner layer is made of polyethylene, both of variable thickness. The impermeable sheet optionally has a transparent area and/or includes graphical prints. The sachet contains absorbing elements.

In addition to the porous sachet patented by Greenkeeper Iberia SL, other sachets manufactured with different types of porous, water-repellent, and breathable materials, mainly Tyvek® or the like, can be found on the market. The keys in the use of these materials lie in their high physical resistance to tearing or ripping and their resistance to moisture.

The problem is that material of this type is expensive, therefore its use must be minimized for financial reasons. In fact, its high cost limits the use of sachets made with said material in many applications.

The use of the anti-damp porous sachet of patent number ES2547033A2 in the field of application mentioned above already drastically reduces the cost of the sachet for various reasons:

it reduces the use of the more expensive, porous, water-repellent, and breathable material by half;
it eliminates the need to use waxes; and
it reduces the printing cost.

However, there is a need to reduce the cost even further in order to continue developing the many applications within the field of application.

A further cost reduction can be obtained by reducing the amount of porous, water-repellent, and breathable material per sachet, and this can be achieved either by reducing the size of the sachet or by increasing the filling density thereof such that less material is required for one and the same amount of granulate. To date, this has yet to be achieved as it is limited by the particle size of the granulated absorbing material contained therein, since smaller particle sizes are required for filling smaller sachets, but these smaller particle sizes emit fine powder which interferes in the optimal welding of the sachets and does not allow assuring the tightness of the sachets.

Therefore, the objective of the present invention is to introduce on the market a new type of sachets with the same strength, air porosity, and anti-damp protection, which can be manufactured, and therefore marketed, at an even lower cost.

Moreover, it should be pointed out that the applicant at least is unaware of the existence of any other sachet or similar patent having technical, structural, and constitutive features similar to those of the sachet herein proposed and claimed.

Moreover, and as a reference to the current state of the art, it should be pointed out that the applicant at least is unaware of the existence of any other ethylene-absorbing sachet or method for producing the granulate or similar invention having technical, structural, and constitutive features that are identical or similar to those of the sachet or method herein claimed.

BRIEF DESCRIPTION OF THE INVENTION

The ethylene-absorbing sachet and the method for producing the granulate contained inside said invention proposed by the invention are therefore configured as a novelty in their field of application, given that the objectives indicated above are specifically and satisfactorily achieved in view of its implementation, with the characterizing details making it possible and distinguishing same being suitably described in the final claims accompanying the present description.

More specifically, as set forth above, the invention proposes an absorbent sachet which, manufactured with porous, water-repellent, and breathable technical materials combined or not with impermeable materials, incorporates therein a granulate of ethylene-absorbing material, the invention being characterized in that the mentioned granulate has a specific particle size with a small dimension but lacks fine powder floating in the air and has a high filling density, said particle size being smaller and said filling density being greater than those used today in conventional sachets of said type currently existing on the market, which advantageously allows the inclusion of a higher amount of granulate in a specific standard sachet format, as well as the manufacture of sachets having a size smaller than those used up until now, always with the edges sealed, which in turn translates into sachet material savings that allows making the manufacture thereof more economical.

More specifically, the granulate contained in the sachet of the invention has a particle size of between approximately 2 and 0.125 mm and a density of between approximately 1.1 and 0.8 g/ml.

In turn, and as a second aspect of the present invention, the method allowing the production of the described granulate with said dimension and density comprises: making use of a specific hammer crusher fed by a screw, with a system consisting of two levels and a coupled screen with two types of mesh sizes, wherein the crushing speed and the feeding speed of the crusher is regulated to achieve optimal synchronization; and controlling the characteristics of each batch of granulate produced.

Finally, it should be pointed out that the granulated material contained in the sachet of the invention may comprise two different types of formulations: a substrate impregnated with potassium permanganate, which has gone through an extrusion process or not; or a mixture of the preceding formula with activated carbon having a mesh size of 12×40 (according to the American Sieve Standard or US Sieve STD)

As mentioned above, the main advantage of the sachet of the invention is that said granulate allows packaging sachets having a smaller size than that which is being used today, as it does not interfere with the sachet welding operation and allows assuring sachet tightness, an essential requirement to assure product safety, since the granulate cannot in any case spill onto the fresh fruit and vegetable product to be protected.

The described operations allow reducing the amount of technical material used in the composition of the current range of ethylene-absorbing sachets which, for example in the case of Greenkeeper Iberia SL, are sachets weighing 9, 7, and 5 g, and furthermore allow manufacturing new sachets having a smaller size, for example 2.7, 1.7, and 0.5 g.

Tables 1 and 2 included below show specific details of the weights and amount of technical material used in the current range of sachets manufactured by the applicant itself up until now. Table 3 shows specific details of the weights and amount of technical material used in a new range of sachets, according to the invention, optimized with a particle size having a smaller dimension and greater density.

TABLE 1

Current range of sachets with granulate formulated without active carbon.

| | | |
|---|---|---|
| Granulate weight (g) | 7 | 5 |
| Sachet size (cm$^2$) | 39.6 | 30.8 |
| Filling density (g/cm$^2$) | 0.18 | 0.16 |

TABLE 2

Current range of sachets with granulate formulated with active carbon.

| | | |
|---|---|---|
| Granulate weight (g) | 5.5 | 3 |
| Sachet size (cm$^2$) | 39.6 | 30.8 |
| Filling density (g/cm$^2$) | 0.14 | 0.10 |

TABLE 3

Range of sachets according to the invention, with smaller and denser granulate formulated without active carbon

| | | | | | | | | |
|---|---|---|---|---|---|---|---|---|
| Weight (g) | 10 | 7 | 5 | 2.7 | 1.7 | 1 | 0.5 | 0.25 |
| Sachet size (cm$^2$) | 39.6 | 33 | 26.4 | 22 | 17.6 | 17.6 | 14.8 | 14.8 |
| Filling density (g/cm$^2$) | 0.25 | 0.21 | 0.19 | 0.12 | 0.10 | 0.06 | 0.03 | 0.02 |

Comparing what is shown in said tables, it can be clearly observed how, for one and the same weight of granulated material in the sachet, for example 7 g, while the required sachet size for conventional sachets is 39.6 cm$^2$ and the filling density achieved is only 0.18 g/cm$^2$, with the small particle size of the proposed sachet of the present invention, for the same weight, i.e., said 7 g taken as an example, the required sachet size is only 33 cm$^2$ whereas the product density can reach 0.21 g/cm$^2$.

Although there are also other manufacturers who manufacture similar ethylene-absorbing sachets with different size formats and product contained therein, none of them has features similar to those of the sachet herein described, since it is usually a product in powder format, balls of between 3 and 5 mm, or pellets, so they are either unsuitable for manufacturing sachets having a small dimension or for being optimally sealed without the product interfering in the sealing.

Table 4 included below shows details of the size, the weight of the granulate contained in sachets manufactured by different manufacturers on the international market, the format of the granulate contained therein, and the amount of technical material used therein:

| Manufacturer | Size (mm) | Area (cm$^2$) | Weight (g) | Granulate format |
|---|---|---|---|---|
| Bioconservacion Origin: Spain | 60 × 65 | 39 | 5 | Powder |
| Ozeano Origin: Spain | 70 × 70 | 49 | 5 | 3-5 mm balls |
| | 70 × 60 | 42 | 3 | |
| Freshpicks Origin: Philippines | 76.2 × 36.6 | 27.9 | 3 | Powder |
| | 50.8 × 63.5 | 32.3 | 5 | |
| | 50.8 × 76.2 | 38.7 | 8 | |
| BioXtend Origin: U.S.A. | 70 × 50 | 35 | 4 | Powder |
| | 70 × 60 | 42 | 5 | |

-continued

| Manufacturer | Size (mm) | Area (cm$^2$) | Weight (g) | Granulate format |
|---|---|---|---|---|
| Ethylene Control Origin: U.S.A. | 70 × 70 | 49 | 5 | Pellets |
| CJS Origin: U.S.A. | 70 × 70 | 49 | 9 | |
| | 55 × 65 | 35.8 | 5 | Pellets |
| Purafil Origin: U.S.A. | 70 × 89 | 62.3 | 10 | 4-5 mm balls |
| CS Pack Origin: Japan | 100 × 130 | 130 | 5 | Non-fluid powder |

There are also other manufacturers who manufacture packaged ethylene-absorbing products weighing less than 10 grams and having a similar appearance. However, the packaging is of a different type, specifically tubes, and manufactured in a different way. The sachet is closed by means of four or three side welds (depending on whether it is manufactured with one or two coils, respectively), whereas the tube is made with a single coil which is folded forming a tube that is closed by means of a vertical weld in the center of one of the two faces and two horizontal welds at both ends for closing the packaging.

Furthermore, the tube-type packaging is not considered of interest from the viewpoint of minimizing costs because although it may contain a greater amount of absorbent, it requires a longer production time and this reduces productivity.

The described ethylene-absorbing sachet and the method for producing the granulate contained inside said sachet therefore represents an innovation in structural and constitutive features that have been unknown up until now, and these reasons, combined with its practical usefulness, provide it with sufficient grounds to obtain the exclusive privilege that is sought.

DESCRIPTION OF THE DRAWINGS

To complement the description that is being made and for the purpose of helping to better understand the features of the invention, a set of drawings is attached to the present specification as an integral part thereof in which the following is depicted in a non-limiting, illustrative manner.

PREFERRED EMBODIMENT OF THE INVENTION

In view of the mentioned figures and according to the numbering used, there can be seen therein, on one hand, a non-limiting embodiment of the existing ethylene-absorbing sachet and of the ethylene-absorbing sachet of the invention, and on the other hand, the machine used for producing the granulate contained inside said sachet of the invention, which sachet and machine comprise what is indicated and described in detail below.

Figure 1:
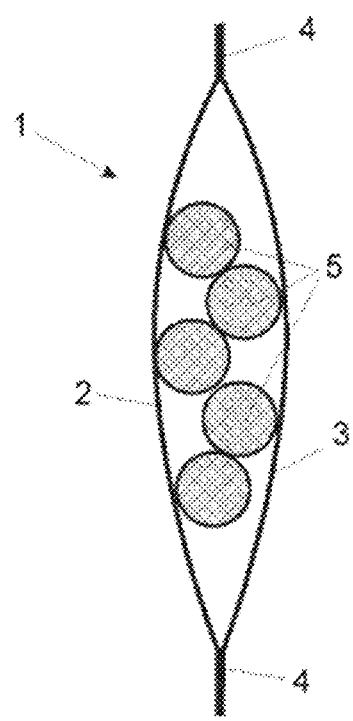
FIG. 1 shows a longitudinal section view of an example of an ethylene-absorbing sachet according to the prior art, where the main elements it comprises, particularly the dimension and filling density of the granulate contained inside said sachet, can be seen.
Figure 2:
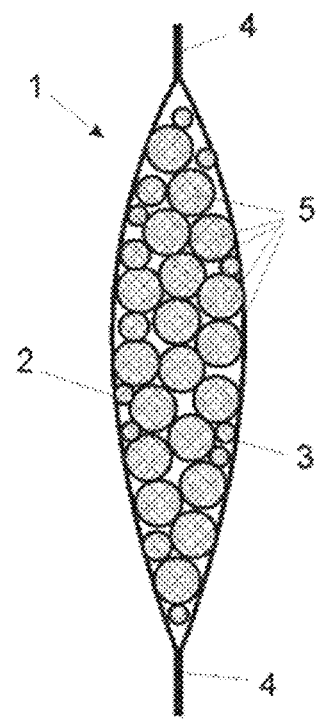
FIG. 2 shows a longitudinal section view of an example of the ethylene-absorbing sachet object of the invention, where the main elements it comprises, particularly the dimension and filling density of the granulate contained inside said sachet which, in comparison with the sachet of the prior art shown in FIG. 1, has a significantly smaller dimension and greater density for one and the same sachet size, can be seen.

In this sense, as seen in FIGS. 1 and 2, the sachet (1) of the invention (FIG. 2), like the sachet (1) of the prior art (FIG. 1), consists of a packaging formed by two sheets, one anterior (2) and one posterior (3), which are mutually joined along their edges (4) by means of welding, at least one of which, for example, the anterior sheet (2), is manufactured from porous, water-repellent, and breathable material, combined or not with another sheet (3) of impermeable material, and the sachet contains therein a granulate (5) of ethylene-absorbing material, which granulate (5) in the sachet (1) of the invention in a characterizing manner has a small particle size or dimension and lacks powder floating in the air during the filling operation and has a high filling density inside the sachet (1), which particle size, as can be seen by comparing said FIGS. 1 and 2, has a significantly smaller dimension and greater density than the particle size of the granulate (5) of the sachet (1) in the prior art.

More specifically, the granulate (5) contained in the sachet (1) of the invention, which preferably consists of a substrate impregnated with potassium permanganate, extruded or not, or a mixture thereof with activated carbon, has a particle size of between approximately 2 and 0.125 mm and a density of between approximately 1.1 and 0.8 g/ml.

Figure 4:
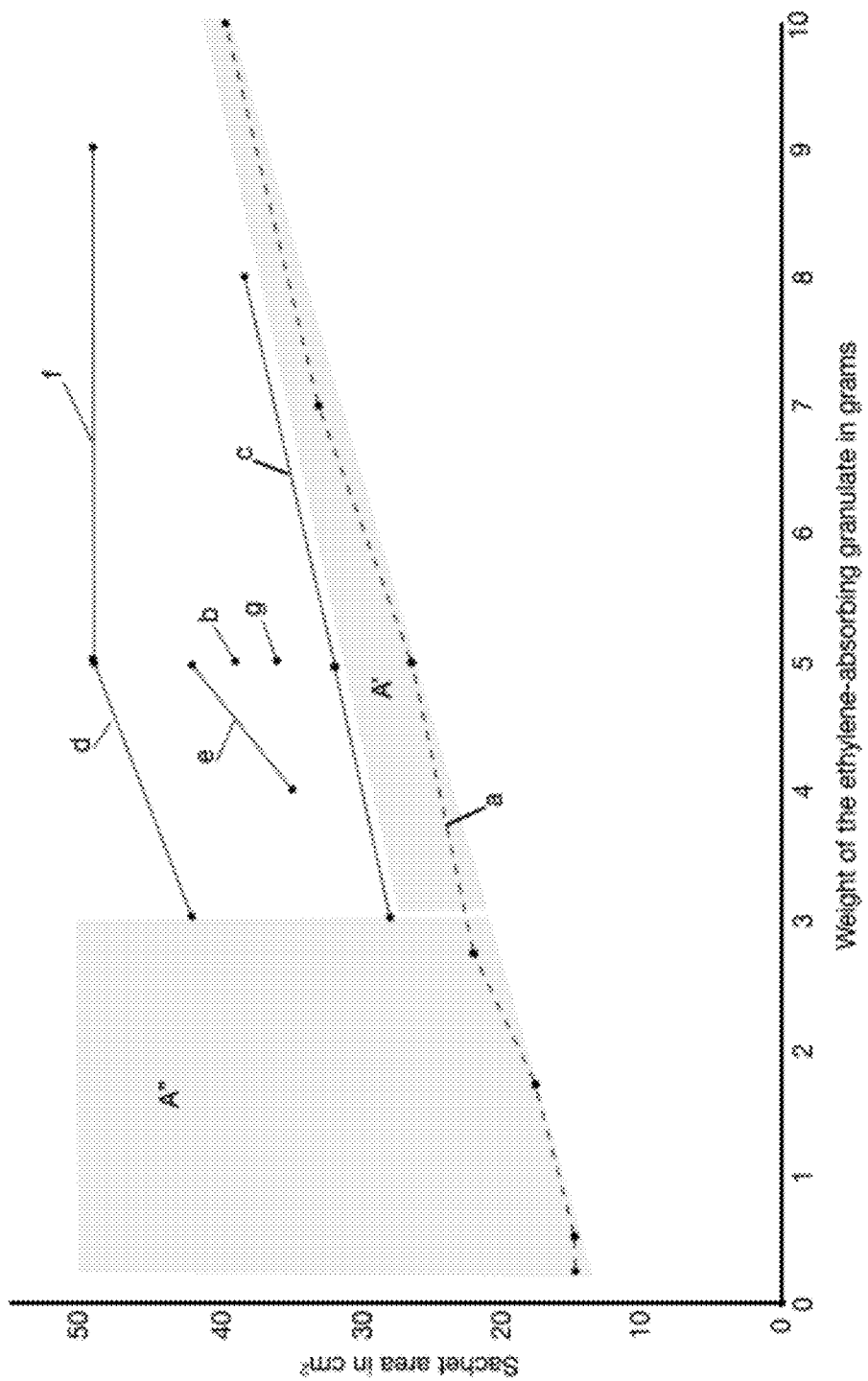
FIG. 4 shows a graph of the ratio between the area of the size of the sachet and the amount of ethylene absorbent in grams contained in the sachets object of the invention, as well as the ratio of other manufacturers on the market.

Furthermore, as seen in the graph of FIG. 4, and as a result of the aforesaid particle size and density of the granulate, in the preferred embodiment of the invention, the ratio of the size of any of the two sheets (2, 3) of the sachet (1) in cm$^2$ and the weight of the granulate (5) contained therein in grams:

is the ratio contained within the area indicated as A' in the diagram of FIG. 4 for the weight range in grams of granulate (5) comprised between 3 and 10 grams, i.e., the weight of the granulate (5) contained therein is up to 3 g for a sachet (1) having a size of between only 21 and 27 cm$^2$; up to 4 grams for a sachet (1) of between 23 and 29 cm$^2$; up to 5 grams for a sachet of between 26 and 31 cm$^2$; up to 6 grams of granulate (5) for a sachet (1) of between 28 and 33 cm$^2$; up to 7 grams of granulate (5) for a sachet (1) of between 31 and 35 cm$^2$; up to 8 grams of granulate (5) for a sachet (1) of between 34 and 37 cm$^2$; and up to 9 grams of granulate (5) for a sachet (1) of between 36 and 40 cm$^2$;

and the ratio contained within the area indicated as A" in the diagram of FIG. 4 for the weight range in grams of granulate (5) comprised between 0.25 and 2.9 grams, i.e., it contains a weight of up to 0.25 grams of granulate (5) for a sachet (1) with an area from 14 to 50 cm$^2$ or more; up to 1 gram of granulate (5) for a sachet (1) from 15 to 50 cm$^2$ or more; up to 2 grams of granulate (5) for a sachet (1) from 18 to 50 cm$^2$ or more; and up to 2.9 g of granulate (5) for a sachet (1) with an area from 20 to 50 cm$^2$ or more.

It should be pointed out that in said graph of FIG. 4, the preferred ratio of the size of the sachet and the weight of the granulate (5) contained in the sachet (1) of the invention is the one represented by means of a dashed line indicated with the reference (a), whereas the regions indicated with references (A') and (A") are what said ratio may encompass. In other words, the preferred ratio is such that it contains:

up to 0.5 g of granulate (5) for a sachet (1) with an area of only 14.8 cm$^2$, up to 1.7 g of granulate (5) for a sachet (1) with an area of 17.6 cm², up to 2.7 g of granulate (5) for a sachet (1) with an area of 22 cm², up to 5 g of granulate (5) for a sachet (1) with an area of 26.4 cm², up to 7 g of granulate (5) for a sachet (1) with an area of 33 cm², and up to 10 g of granulate (5) for a sachet (1) with an area of only 39.6 cm².

Furthermore, said graph of FIG. 4 also shows the comparison of such ratio in the sachets of other manufacturers existing on the market, indicated with solid, thick lines and dots, with the following references: Bioconservacion (b), Freshpicks (c), Ozeano (d), BioXtend (e), Ethylene Control (f), CJS (g).

In any case, the granulate (5) contained in the sachet (1) of the invention comprises a substrate impregnated with potassium permanganate, which has gone through an extrusion process or not, or a mixture of said substrate impregnated with activated carbon having a mesh size of 12×40 according to US Sieve STD.

Figure 3:
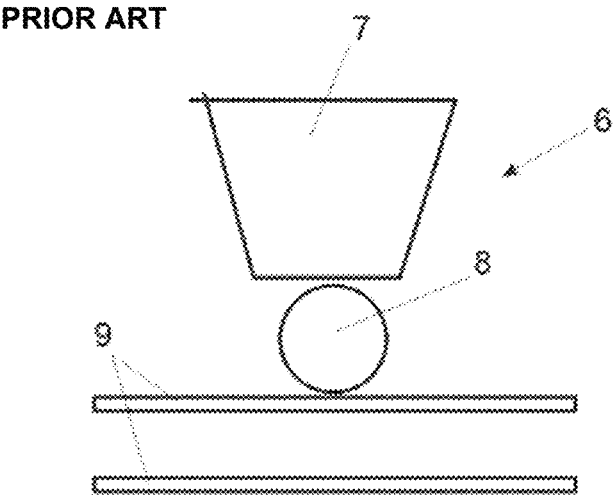
FIG. 3 shows a schematic view of the crushing machine used for producing the granulate having a small dimension and lacking powder floating in the air contained inside the sachet.

In turn, FIG. 3 shows, in a highly schematic manner, an example of the crushing machine (6) used for producing said granulate (5) having said particle size and lacking fine powder floating in the air, which machine comprises, in addition to a feed hopper (7), a hammer crusher fed by a screw (8), and a screen system consisting of two levels (9) with two types of mesh sizes. Furthermore, said crusher (6) has regulating means (not depicted) for regulating the crushing speed and the feeding speed to synchronize both parts of the machine, which are controlled, for example, through a PLC.

Having sufficiently described the nature of the present invention, as well as the manner of putting it into practice, it is not considered necessary to expand on this explanation so that one skilled in the art will understand its scope and the advantages derived from it, hereby stating that within its essential nature, the invention may be carried out to practice in other embodiments which differ in detail from that indicated by way of example and which will likewise attain the protection that is sought provided that its fundamental principle is not altered, changed, or modified.

The invention claimed is:

1. An ethylene-absorbing sachet comprising:
   a packaging formed by an anterior sheet (2) made from a porous, water-repellent, and breathable material and a posterior sheet (3) made from an impermeable material; and
   a granulate (5) of ethylene-absorbing material contained inside said packaging, said granulate (5) lacks powder emitted by the granulate that float in the air, has a particle size of between approximately 2 and 0.125 mm, and a filling density inside the sachet (1) of up to 0.25 g/cm², wherein said anterior sheet (2) and said posterior sheet (3) are welded together along their edges so that the granulate (5) contacts said anterior sheet (2) and said posterior sheet (3).

2. The ethylene-absorbing sachet according to claim 1, characterized in that said granulate (5) contained in the sachet (1) has a density of between approximately 1.1 and 0.8 g/ml.

3. The ethylene-absorbing sachet according to claim 1, characterized in that the sachet (1) contains up to 0.5 g of granulate (5) for a sachet (1) with an area of 14.8 cm²; it contains up to 1.7 g of granulate (5) for a sachet (1) with an area of 17.6 cm²; contains up to 2.7 g of granulate (5) for a sachet (1) with an area of 22 cm²; it contains up to 5 g of granulate (5) for a sachet (1) with an area of 26.4 cm²; it contains up to 7 g of granulate (5) for a sachet (1) with an area of 33 cm²; and contains up to 10 g of granulate (5) for a sachet (1) with an area of 39.6 cm².

4. The ethylene-absorbing sachet according to claim 1, characterized in that the sachet (1) contains up to 3 g of granulate (5) for a sachet (1) having an area of between 21 and 27 cm²; up to 4 grams of granulate (5) for a sachet (1) having an area of between 23 and 29 cm²; up to 5 grams of granulate (5) for a sachet (1) having an area of between 26 and 31 cm²; up to 6 grams of granulate (5) for a sachet (1) having an area of between 28 and 33 cm²; up to 7 grams of granulate (5) for a sachet (1) having an area of between 31 and 35 cm²; up to 8 grams of granulate (5) for a sachet (1) having an area of between 34 and 37 cm²; and up to 9 grams of granulate (5) for a sachet (1) having an area of between 36 and 40 cm².

5. The ethylene-absorbing sachet according to claim 1, characterized in that the sachet (1) contains a weight of up to 0.25 grams of granulate (5) for a sachet (1) with an area of at least 14 cm²; up to 1 gram of granulate (5) for a sachet (1) with an area of at least 15 cm²; up to 2 grams of granulate (5) for a sachet (1) with an area of at least 18 cm²; and up to 2.9 g of granulate (5) for a sachet (1) with an area of at least 20 cm².

6. The ethylene-absorbing sachet according to claim 1, characterized in that the granulate (5) comprises a substrate impregnated with potassium permanganate.

7. The ethylene-absorbing sachet according to claim 1, characterized in that said ethylene-absorbing sachet includes said granulate (5) mixed with activated carbon having an American Standard Sieve mesh size of 12×40.

8. The ethylene-absorbing sachet according to claim 7, wherein the granulate (5) comprises a substrate impregnated with potassium permanganate.

* * * * *